Jan. 21, 1958 A. HEATHCOTE ET AL 2,820,850

SELECTING ARRANGEMENTS

Filed Feb. 24, 1955 2 Sheets-Sheet 1

Inventors
ALAN HEATHCOTE
DOUGLAS AUSTIN READ
By Young, Emery & Thompson
Attorneys Inventors
ALAN HEATHCOTE
DOUGLAS AUSTIN READ
By Young, Emery & Thompson
Attorneys United States Patent Office 2,820,850

Patented Jan. 21, 1958

2,820,850

SELECTING ARRANGEMENTS

Alan Heathcote and Douglas Austin Read, Liverpool, England, assignors to Automatic Telephone & Electric Company Limited, Liverpool, England, a British company Application February 24, 1955, Serial No. 490,305

Claims priority, application Great Britain March 20, 1954

8 Claims. (Cl. 179—18)

The present invention relates to circuit arrangements for selecting one of a plurality of outlets and is more particularly concerned with arrangements of this type which operate at high speed.

The main object of the invention is to provide circuit arrangements in which the speed of operation may be increased without sacrificing accuracy in operation and in which the power consumption is considerably reduced.

According to one feature of the invention, circuit arrangements for selecting one of a plurality of outlets comprise a group of serially-connected static circuit elements of a first order and a plurality of groups of serially-connected circuit elements of a second order, each circuit element representing one outlet and each circuit element of said first order being associated with a group of circuit elements of the second order while each circuit element is so arranged that according to conditions applied thereto an input pulse is repeated either to the next element of the group or to either the first element of the associated group of the next order or the output of the circuit element whereby the application of a marking to a circuit element of each order enables an outlet to be selected on the application of a pulse to the first circuit element of the first order.

According to another feature of the invention, circuit arrangements for selecting one of a plurality of outlets comprise a group of serially-connected static circuit elements of a first order, a plurality of groups of serially-connected circuit elements of a final order, each circuit element representing one outlet and a plurality of groups of serially-connected circuit elements of at least one intermediate order, each circuit element of one order being associated with a group of circuit elements of the higher order and each circuit element being so arranged that according to bias potentials applied thereto an input pulse is repeated either to the next element of the group or to either the first element of the associated group of the next higher order or the output of the circuit element in the case of final order elements whereby the application of a marking to a circuit element of each order enables an outlet to be selected on the application of a pulse to the first circuit element of the first order.

Figure 1:
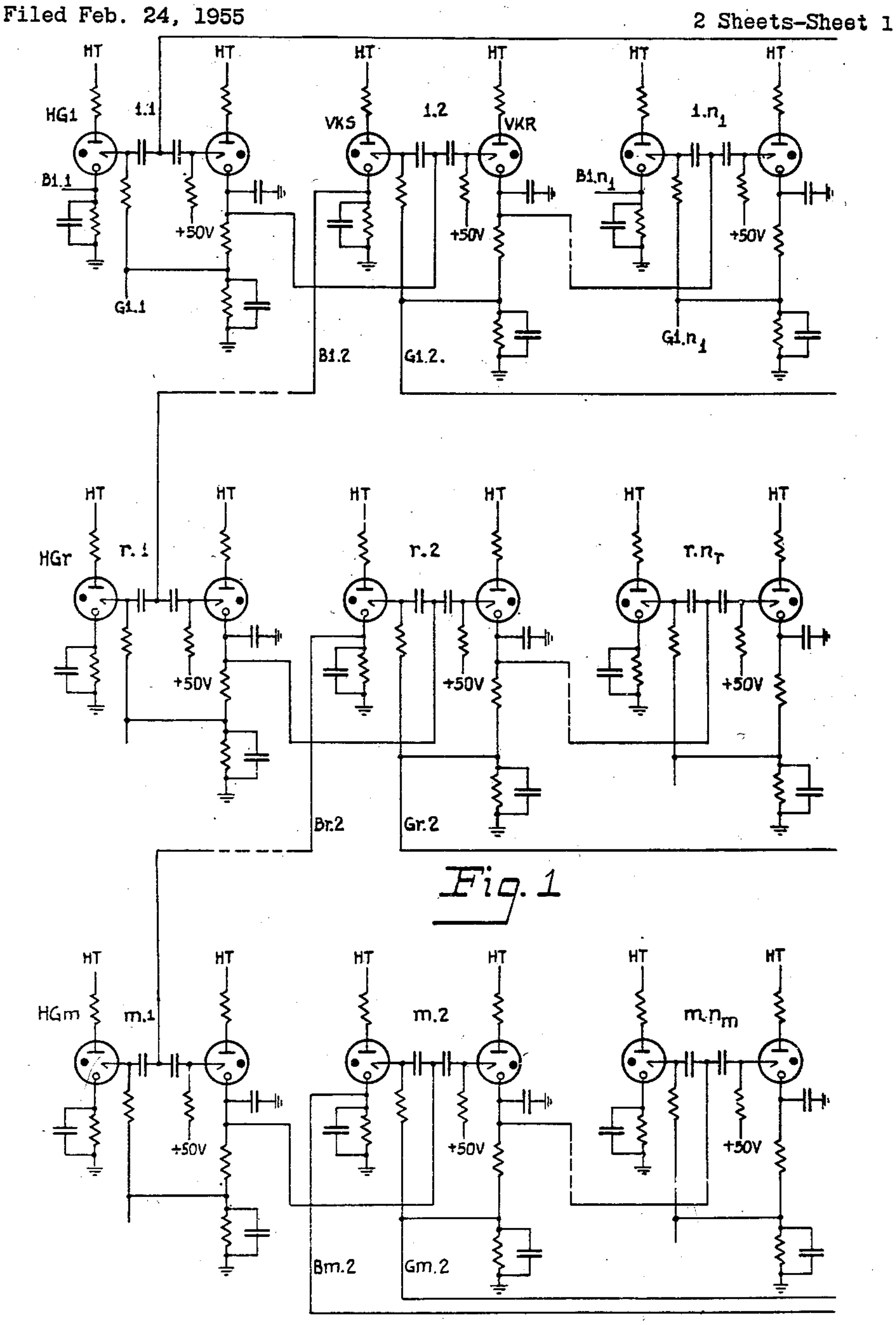
Figure 2:
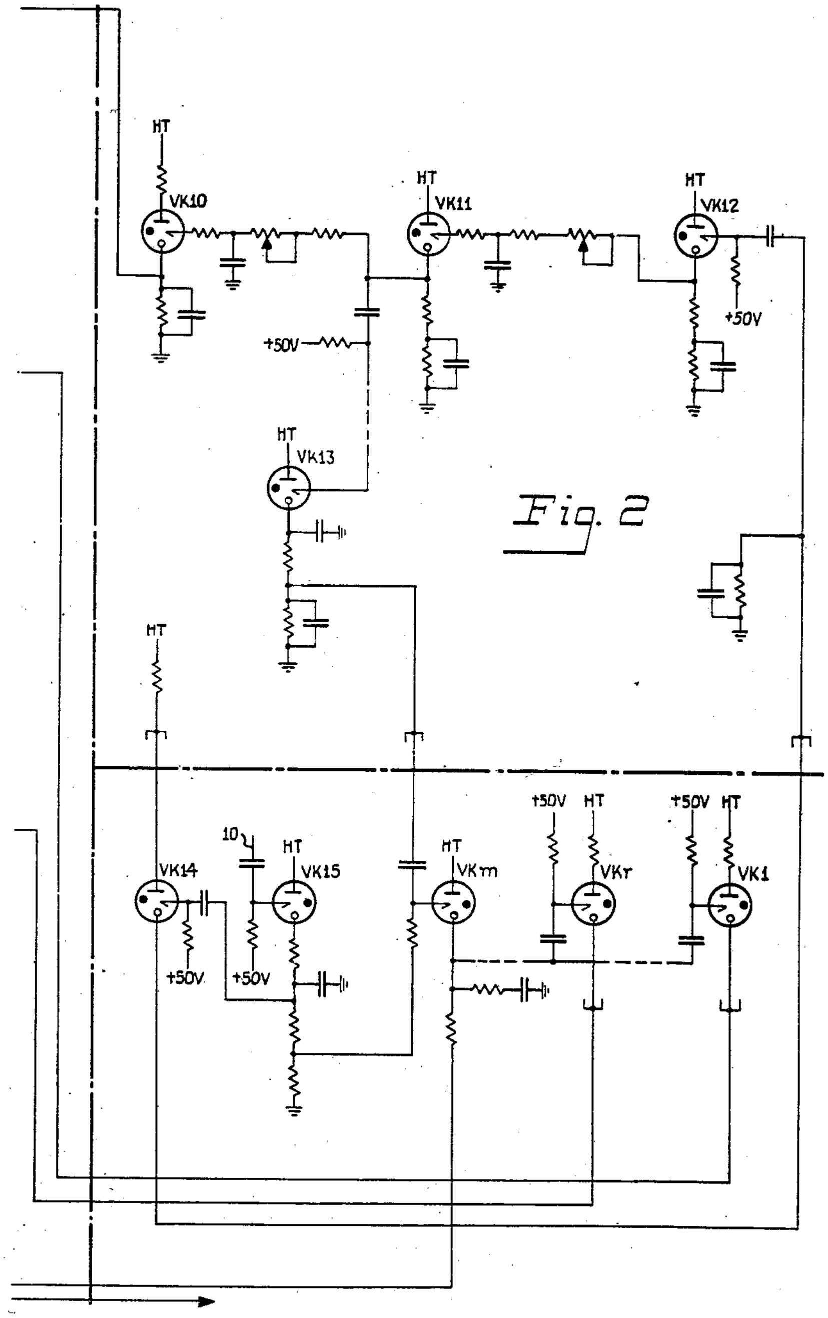

The invention will be better understood from the following description of one embodiment taken in conjunction with the accompanying drawings comprising Figs. 1 and 2 which should be arranged side-by-side with Fig. 1 on the left.

The invention arises due to the necessity in automatic telephone systems associating a piece of equipment exclusively with one of a plurality of outlets to which said piece of equipment is common. The order in which various outlets require connection to the common equipment is entirely random and arises when a particular condition, the calling condition, exists at an outlet.

One method of effecting such an association between a calling outlet and the common equipment is to provide a plurality of circuit elements equal in number to the number of outlets and to arrange the circuit elements in a sequential test chain. When an outlet is in a calling condition, a marking is extended to the corresponding circuit element in the test chain and a pulse is then applied to the input of the test chain. The circuit elements forming the chain are so arranged that if a circuit element is not marked an applied pulse is repeated to the next circuit element of the chain while if the circuit element is marked, the applied pulse is repeated to the calling outlet to cause the exclusive connection of that calling outlet with the common equipment.

A start circuit is provided in common to all the outlets and when one or more outlets are in the calling condition, this is detected by the start circuit which thereupon applies a mark to all the outlets. This mark in conjunction with the calling condition of the outlet or outlets causes a marking to be extended to the circuit element or elements corresponding to the calling outlets. Further the start circuit, after a delay to allow for stabilisation of the marking, applies a pulse to the first circuit element of the chain. The circuit elements operate in sequence until the first marked element is reached whereupon further operation of the chain is prevented and the outlet corresponding to the first marked element is associated exclusively with the common equipment.

These arrangements are found to be quite satisfactory in general but they do not satisfy the requirements where a very large number of outlets have access to the common equipment.

For instance, if in a 10,000 line exchange there are 300 electronic registers and one electronic translator provided in common thereto, there would be 300 circuit elements in the sequential test chain. The time of operation of one circuit element may be 50 microseconds and hence if the calling register corresponds to the last circuit element in the chain, the operating time of the chain will be $300 \times 50$ microseconds=15 milliseconds. This period is in itself large compared with the holding time of the translator so that it will be seen that the previously described known arrangements are inadequate. In addition the time of operation of one circuit element may be more than 50 microseconds and in fact a time of operation of 100 microseconds is not out of the question.

It will also be understood that with a large test chain comprising 300 circuit elements, a fault in an early circuit element in the chain may result in the failure to test the subsequent outlets. Further if one of the outlets is frequently calling and its corresponding circuit element is late in the chain, all the preceding circuit elements have to be operated before the required outlet is reached thereby wasting considerable time.

The arrangement of the present invention employs a plurality of sequential test chain arranged in different orders in the manner shown in the drawing.

The arrangement of the counting chains in orders is determined by the factors of the number of outlets. For instance if there are 300 outlets, 300 may be written $3 \times 10 \times 10$ and there will be three orders. The arrangement is such that the first order chain will comprise 3 serially-arranged circuit elements each having access to a second order chain having 10 serially-arranged elements so that there will be a total of 30 second order elements. Each element of a second order chain has access to a third order chain also having 10 serially-arranged elements so that there will be a total of 300 third order elements each individual to one outlet. In operation, a pulse applied to an element of a chain is either repeated to the next element of the chain or to the first element of the associated chain of the next order. With this arrangement it will be appreciated that the number of tubes which must be struck in order to obtain access to the last outlet is 23 whereas in the series chain arrangement 300 tubes would have to be struck. This not only increases the speed of operation as previously mentioned but it also reduces the power consumption.

In general terms, if N is the number of outlets and $N=n_1\times n_2\times n_3\times \ldots n_r \ldots xn_m$, there will be a total of $m$ orders and there will be $n_1$ elements forming the first order chain. There will be $n_1$ chains of the second order each comprising $n_2$ elements and there will be $n_1\times n_2$ chains of the third order each comprising $n_3$ elements and so on. Finally there will be $$n_1\times n_2 \ldots \times n_{m-1}$$

chains of the $m^{th}$ order each comprising $n_m$ elements. With this arrangement the greatest number of circuit elements which must be operated to reach any outlet is $n_1+n_2+n_3 \ldots +n_r+n_m$ which is obviously less than N which is the maximum number in the prior arrangement.

In the drawing three orders only are shown but the dotted connection between the orders indicates that further orders may be inserted. Further only three elements have been shown in each chain but again the dotted connection between the second and third indicates that further elements may be inserted. Thus the 1st order chain HG1 consists of circuit elements 1.1, 1.2 . . . 1.$n_1$. The $r^{th}$ order chain HG$r$ associated with element 1.2 of the first order chain consists of circuit elements $r$.1, $r$.2 . . . $r.n_r$ and the $m^{th}$ order chain HG$m$ associated with the element $r$.2 of the $r^{th}$ order chain consists of elements $m$.1, $m$.2 . . . $m.n_m$.

Each circuit element consists of a pair of tubes, such as VKS and VKR of element 1.2. Tube VKR is normally biased by the application of +50 v. to the trigger electrode while the trigger electrode of VKS is normally at earth potential. The application of a pulse to the trigger electrodes of the two tubes thus causes VKR only to strike and the pulse is repeated from the cathode of VKR to the VKS and VKR tubes of the next circuit element of the chain. If, however, a positive potential i. e. a marking, is applied to lead G1.2, tube VKR will be backed off while a priming potential will be applied to the trigger electrode of tube VKS. A pulse applied to the trigger electrodes of the two tubes will then strike tube VKS only and the pulse will be repeated from the cathode of tube VKS to the trigger electrodes of the VKS and VKR tubes of the first circuit element of the associated chain of the next order.

The marking of the tubes is effected by circuits each of which is individual to one outlet, one of these circuits being shown within dotted lines in the figure. In a marking circuit one tube is provided for each order and three VK1, VK$r$ and VK$m$ are shown in the drawing. Tube VK1 applies a marking to the appropriate tube in the first order chain HG1, tube VK$r$ applies a marking to the appropriate tube in the appropriate one of the $r^{th}$ order chains and tube VK$m$ applies a marking to the appropriate tube in the appropriate one of the $m^{th}$ order chains. Since the total number of circuit elements in the $m^{th}$ order chains are equal to the number of outlets, tube VK$m$ is connected individually to appropriate circuit element. As regards tube VK$r$ this is connected in common with corresponding tubes of all positions having the same $r$ value such as $r_2$ to the circuit element corresponding to this value. Similarly tube VK1 is connected in common with corresponding tubes of all positions having the same HG1 value to the circuit element corresponding to this value in the chain of the 1st order.

In operation, when an outlet, for instance a register in the register translator system previously mentioned, requires connection to the common equipment, i. e. the translator, a pulse is applied from the register to lead 10 thus causing tube VK15 to strike, this tube being normally primed by 50 v. connected to the trigger electrode. Tube VK15 causes tube VK14 to strike which thereupon applies a pulse to tube VK12 in the common start circuit.

Tube VK15 in striking also applies a bias to tube VK$m$. In the start circuit, tube VK12 strikes in response to the pulse from tube VK14. Tube VK12 in striking applies a pulse to tube VK11 via a delay circuit which prevents tube VH11 striking until the bias applied to VK$m$ has had time to become stabilised. When tube VK11 strikes it applies a pulse to tube VK13 which also strikes and applies as pulse to the VK$m$ tubes of all the registers. It will be understood that if there are a very large number of registers it is preferable to provide more than one tube such as VK13. The primed tubes VK$m$ strike which are appropriate to all registers in the calling condition and in striking these tubes apply a pulse to the $(m-1)$ marking tubes of which only VK$r$ and VK$m$ are shown. It will be seen that the cathode resistors of the marking tubes are common with the VKR tubes of the appropriate circuit elements of the different orders and hence the striking of the marking tubes serves to mark these circuit elements as previously described.

In the start circuit the striking of tube VK11 also applies a pulse via a delay circuit to tube VK10 which strikes after a delay sufficient to allow the marking potentials to become stabilised. In striking tube VK10 applies a pulse to the first circuit element 1.1 of the first order chain. This circuit element is not marked so that the VKR tube strikes and repeats the pulse to the second circuit element. This circuit element is marked and hence the VKS tube strikes and repeats the pulse and lead B1.2 to the first circuit element of the associated chain of the second order. The operation here is the same as in the first order chain and this continues for the succeeding orders, the circuit element $r$.2 since this element is marked from tube VK$r$ repeating the pulse over lead B$r$.2 to the next order chain. Finally the pulse is repeated to the first circuit element of the appropriate chain of the $m^{th}$ order and since circuit element $m$.2 is marked, the pulse is repeated over lead B$m$.2 to the first occurring register where it is used to associate the register with the translator. The equipment is restored to normal by disconnection of the HT supply after the completion of a cycle of operation or by the disconnection of the common cathode return.

The increase of speed obtained by the use of the invention necessitates an increase in the number of tubes used. It can be shown that this increase is just over 1 tube per outlet per additional order. It can also be shown that while the least search time is obtained by making $m$ large i. e. by taking $N=2m$ as nearly as possible, increasing $m$ beyond 2 is only justified if even greater hunting speeds are required and a large number of outlets are provided.

In the majority of cases, therefore, two orders only will be necessary and in the case where there are 100 outlets, for example, the first order chain could comprise 5 circuit elements and each of the 5 second order chains could comprise 20 circuit elements. It would however be more economical to employ 10 circuit elements in each chain. It will, however, be understood that the invention is not limited to two orders or to the particular arrangements discussed but includes within its scope the general case described above.

It will, therefore, be seen that the invention provides an extremely efficient selecting arrangement which operates with considerably higher speed and with considerably less power consumption than the known arrangements. Further in view of the fact that in any selecting operation, fewer tubes have to be struck than heretofore, the life of the tubes and the circuit components is increased.

What is claimed is:

1. A selecting device comprising a plurality of outlets, a group of serially-connected static circuit elements of a first order, a plurality of groups of serially-connected static circuit elements of a second order, means connecting each static circuit element of said second order to one of said outlets, means connecting each static circuit element of one order to the first circuit of a group of static circuit elements of the next order, means for applying conditioning signals to said static circuit elements, means responsive to the application of a pulse input to a static circuit element of a group in the absence of a conditioning signal for repeating a pulse to the next succeeding static circuit element of the same group, means responsive to the application of a pulse input to a static circuit element of a group of said first order in the presence of a conditioning signal for repeating a pulse to the first static circuit element of the connected group of the next order and means responsive to the application of a pulse input to a static circuit element of a group of said second order in the presence of a conditioning signal for applying a seizing signal to the connected outlet whereby the application of a conditioning signal to one static circuit element of each order and the application of a pulse input to the first static circuit element of the first order causes a seizing signal to be applied to a particular outlet as determined by the static circuit elements to which the conditioning signals have been applied.

2. A selecting device comprising a plurality of outlets, a group of serially-connected two-position static circuit elements of a first order, a plurality of groups of serially connected two-position static circuit elements of a second order, an input lead and first and second output leads for each of said two-position static circuit elements, the first output lead of each of said two-position static circuit elements except the last in a group being connected to the input lead of the next two-position static circuit element of the same group, the second output lead of each two-position static circuit element of the first order being connected to the input lead of the first two-position static circuit element of a group of two-position circuit elements of the next order while the second output lead of each two-position static circuit element of the second order is connected to one of said outlets, means for applying conditioning signals to said two-position static circuit elements, means responsive to the application of a pulse to the input lead of a two-position static circuit element in the absence of a conditioning signal for causing said two-position static circuit element to assume one position to repeat the pulse to the first output lead, means responsive to the application of a pulse to the input lead of a two-position static circuit element of a group of said first order in the presence of a conditioning signal for causing said two-position static circuit element to assume the second position to repeat the pulse to the second output lead and means responsive to the application of a pulse to the input lead of a two-position static circuit element of said second order in the presence of a conditioning signal for causing said two-position static circuit element to assume the second position to apply a seizing signal to the second output lead whereby the application of a conditioning signal to one two-position static circuit element of each order and the application of a pulse to the input lead of the first two-position static circuit element of said first order causes a seizing signal to be applied to a particular outlet as determined by the two-position static circuit elements to which the conditioning signals have been applied.

3. A selecting device comprising a plurality of outlets, a group of serially-connected two-position static circuit elements of a first order, a plurality of groups of serially-connected two-position static circuit elements of a final order, a plurality of groups of serially-connected two-position static circuit elements of at least one intermediate order, an input lead and first and second output leads for each of said two-position static circuit elements the first output lead of each of said two-position static circuit elements except the last in a group being connected to the input lead of the next two-position static circuit element of the same group, the second output lead of each two-position static circuit element of the first and intermediate orders being connected to the first two-position static circuit element of a group of two-position static circuit elements of the next higher order while the second output lead of each two-position static circuit element of said final order is connected to one of said outlets, means for applying conditioning signals to said two position static circuit elements, means responsive to the application of a pulse to the input lead of a two-position static circuit element in the absence of a conditioning signal for causing said two-position static circuit element to assume one position to repeat the pulse to the first output lead, means responsive to the application of a pulse to the input lead of a two-position static circuit element of a group of said first and intermediate orders in the presence of a conditioning signal for causing said two-position static circuit element to assume the second position to repeat the pulse to the second output lead and means responsive to the application of a pulse to a two-position static circuit element of said final order in the presence of a conditioning signal for causing said two-position static circuit element to assume the second position to apply a seizing signal to the second output lead whereby the application of a conditioning signal to one two-position static circuit element of each order and the application of a pulse to the input lead of the first two-position static circuit element of said first order causes a seizing signal to be applied to a particular outlet as determined by the two-position static circuit elements to which the conditioning signals have been applied.

4. A selecting device as claimed in claim 3 wherein each two-position static circuit element comprises first and second gas-filled discharge tubes having an anode, a cathode and an ingnition electrode, the input lead being connected to the ignition electrodes of said first and second tubes.

5. A selecting device as claimed in claim 4 wherein a source of biasing potential is permanently connected to the ignition electrode of said first tube while a lead to which the conditioning signal is applied is connected to a point in the cathode load of the first tube and to the ignition electrode of the second tube, the first and second output leads being connected to the cathodes of the first and second tubes respectively.

6. A selecting device as claimed in claim 5 wherein said conditioning signals consist of biasing potentials and the means for applying the biasing potentials to the first and second gas-filled discharge tubes comprise for each outlet a first gas-filled discharge tube individual to one two-position static circuit element of the final order, a second gas-filled discharge tube individual to one two-position static circuit element of the first order and at least one further tube individual to one two-position static circuit element of the intermediate order.

7. A selecting device as claimed in claim 6 and comprising in addition means for causing said first discharge tube to conduct, means responsive to the conduction of said first discharge tube for applying a biasing potential to said one two-position static circuit element of the final order and for causing said second and further discharge tubes to conduct and means responsive to the conduction of said second and further discharge tubes for applying a biasing potential said one two-position static circuit element of the first order and said one two-position static circuit element of said intermediate order respectively.

8. Circuit arrangements for applying potential to a selected one of a plurality of outlets comprising a group of serially-connected two-position static circuit elements of a first order, a plurality of groups of serially-connected two-position static circuit elements of a final order, a plurality of groups of serially-connected two-position static circuit elements of at least one intermediate order, an input lead and first and second output leads for each of said two-position static circuit elements, the first output lead of each of said two-position static circuit elements except the last in a group being connected to the input lead of the next two-position static circuit element of the same group, the second output lead of each two-position static circuit element of the first and intermediate orders being connected to the first two-position static circuit element of a group of two-position static circuit elements of the next higher order while the second output lead of each two-position static circuit element of said final order is connected to one of said outlets, means for applying a biasing potential to each of said two-position static circuit elements, means responsive to the application of a pulse to the input lead of a two-position static circuit element in the absence of said biasing potential for causing said two-position static circuit element to assume one position to repeat the pulse to the first output lead, means responsive to the application of a pulse to the input lead of a two-position static circuit element of a group of said first and intermediate orders in the presence of said biasing potential for causing said two-position static circuit element to assume the second position to defeat the pulse to the second output lead and means responsive to the application of a pulse to a two-position static circuit element of said final order in the presence of a biasing potential for causing said two-position static circuit element to assume the second position to apply a potential to the second output lead whereby the application of a biasing potential to one two-position circuit element of each order and the application of a pulse to the input lead of the first two-position static circuit element of said first order causes a potential to be applied to a particular outlet as determined by the two-position circuit elements to which biasing voltages have been applied.

No references cited.